United States Patent [19]

Rottmann

[11] Patent Number: 4,807,677
[45] Date of Patent: Feb. 28, 1989

[54] DEVICE FOR MACHINING PLATE-SHAPED WORKPIECES, AS WELL AS BATTENS OR TIMBER STRIPS

[75] Inventor: Manfred Rottmann, Hiddenhausen, Fed. Rep. of Germany

[73] Assignee: SBR Maschinen-Handelsgesellschaft mbH & Co. KG, Herford, Fed. Rep. of Germany

[21] Appl. No.: 116,724
[22] PCT Filed: Dec. 29, 1986
[86] PCT No.: PCT/EP86/00782
§ 371 Date: Sep. 10, 1987
§ 102(e) Date: Sep. 10, 1987
[87] PCT Pub. No.: WO87/04108
PCT Pub. Date: Jul. 16, 1987

[30] Foreign Application Priority Data

Jan. 11, 1986 [DE] Fed. Rep. of Germany ....... 3600633

[51] Int. Cl.⁴ .............................................. B21M 1/08
[52] U.S. Cl. ..................... 144/3 R; 29/564; 144/242 D; 144/245 A; 144/367
[58] Field of Search ................... 144/1 R, 3 R, 242 R, 144/242 D, 245 R, 245 A, 367, 363; 29/563, 564

[56] References Cited

U.S. PATENT DOCUMENTS

| | | |
|---|---|---|
| 3,068,915 | 12/1962 | Arnett . |
| 3,194,380 | 7/1965 | Watson . |
| 3,736,968 | 6/1973 | Mason ................. 144/3 R |
| 4,054,070 | 10/1977 | Steiling ..................... 83/425.3 |
| 4,185,672 | 1/1980 | Vif et al. ..................... 144/3 R |
| 4,677,733 | 7/1987 | Andersson ..................... 144/3 R |

FOREIGN PATENT DOCUMENTS

| | | |
|---|---|---|
| 698668 | 10/1940 | Fed. Rep. of Germany . |
| 2539124 | 3/1977 | Fed. Rep. of Germany . |
| 2715377 | 10/1978 | Fed. Rep. of Germany . |
| 2907304 | 8/1980 | Fed. Rep. of Germany . |
| 3022331 | 12/1980 | Fed. Rep. of Germany . |
| 3248117A1 | 6/1984 | Fed. Rep. of Germany . |
| 8219661 | 6/1983 | France . |
| 1307388 | 2/1973 | United Kingdom ............... 144/3 R |
| 2118095A | 10/1983 | United Kingdom . |

Primary Examiner—W. Donald Bray
Attorney, Agent, or Firm—Foley & Lardner, Schwartz, Jeffery, Schwaab, Mack, Blumenthal & Evans

[57] ABSTRACT

A device for machining plate-like workpieces comprises first and second parallel conveyor units each including upper and lower chain belts arranged with a clearance therebetween and driven in opposite directions. The lower chain belts have opposite ends extending beyond corresponding opposite ends of the upper chain belts thereby forming input and output regions of the workpieces. In the output region of the first conveyor unit and the input region of the second conveyor unit are roller tracks which operate transversely to the opposite directions of travel of the first and second conveyor units. The roller tracks are able to be raised and lowered relative to the chain belts. The tracks are linked together by a transverse conveyor. A machining station is positioned between the first and second conveyor units and includes a plurality of machining devices for performing operations on the workpieces moving along the conveyor units.

9 Claims, 1 Drawing Sheet

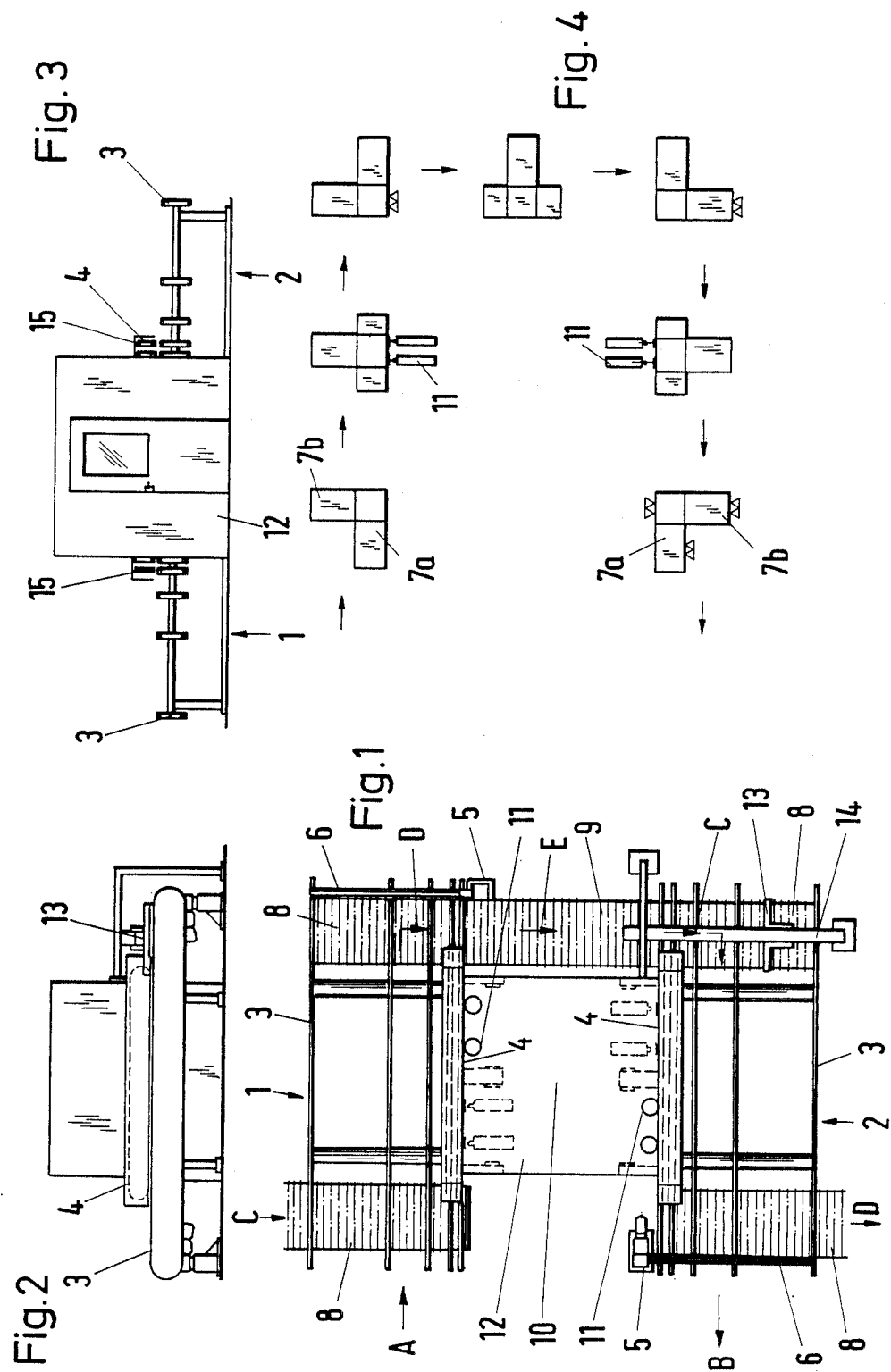

DEVICE FOR MACHINING PLATE-SHAPED WORKPIECES, AS WELL AS BATTENS OR TIMBER STRIPS

BACKGROUND OF THE INVENTION

The invention relates to a device for machining plate-like workpieces, eg. furniture components, doors or windows, as well as battens or timber strips, consisting of continuously-driven lower endless chain belts, which carry the workpieces, also continuously-driven upper endless chain belts, which act on the workpieces from above, as well as of machining devices for the workpieces, arranged alongside these conveyors.

The machining devices comprise saws, mortisers, edge-gluers or similar. For machining the edges of a workpiece, a complicated manipulation of this workpiece is necessary.

SUMMARY OF THE INVENTION

The invention is based on the object of improving the device explained at the start with respect to the manipulation of the workpieces.

This object is achieved according to the invention by the following features:
(a) There is a first and a second mutually-parallel conveyor unit, comprising respectively upper and lower chain belts, arranged with a clearance between them and driven in opposite directions of travel;
(b) The lower chain belts are extended at their two ends beyond the corresponding upper chain belts and form at this point an input or output region for the workpieces;
(c) In the output region of the first conveyor unit as well as in the opposite input region of the second conveyor unit are roller tracks or similar which operate transversely to the direction of travel of the conveyor units, said tracks being able to be raised above the lower chain belt as well as being able to be lowered between the lower chain belts, and being linked together by a transverse conveyor;
(d) Arranged between the two conveyor units is a machining cell which comprises all the machining devices of the two conveyor units.

It is advantageous here if there are in the input region of the first conveyor unit as well as in the output region of the second conveyor unit, roller tracks or similar which operate transversely to the direction of travel of the conveyor units, said tracks being able to be raised above the lower chain belt as well as being able to be lowered between the lower chain belts.

The number and spacing of the alower chain belts correspond to the workpiece dimensions to be machined. To take over the workpiece, the lower chain belts are extended beyond the upper chain belt. The upper chain belt can in each case be designed as a double chain belt, the spacing of which is determined by the smallest workpiece width. In addition, the upper chain belts can be provided with a soundproof cover.

In order to ensure a continuous workpiece transport, it is advantageous if the lower and upper chain belts of each conveyor unit are driven synchronously via direct-current geared motors.

For positioning of the workpieces upon entering into the second conveyor unit, it is advantageous if at least one positioning backrest for the workpieces, which is adjustable in the direction of travel of the transverse conveyor, is arranged in the input region of the second conveyor unit. If there are large differences in length between the workpieces to be machined, it is advantageous if several such positioning backrests are provided.

The raisable and lowerable roller tracks can also be substituted by other conveying devices acting in a similar manner. The cyclic control of the raising and lowering movements of the roller tracks is likewise performed from the machining cell, which can be surrounded by a soundproof case and, apart from all the necessary machining devices of the two conveyor units, also comprises the controls for the roller tracks as well as the positioning backrest and for the straightline control.

The machining center according to the invention is suitable for longitudinal and transverse machining, the workpieces, which first pass in longitudinal direction through the two conveyor units, subsequently being introduced once again in transverse direction into the device, if all four edges of the plate-shaped workpiece have to be machined. Production is independent of length and can be carried out continuously, to be precise in small batch production and in single piece production. There are no changeover times in cases of a change in length. Assembly-related production (consignment production) is possible. Only one person is necessary for operation of the entire device. The arrangement of the soundproof case described above, which can be provided with a central extractor, provides a high level of protection for the surrounding workplaces.

Further features of the invention are the subject of the subclaims and are explained in more detail, together with further advantages of the invention, with reference to an exemplary embodiment.

BRIEF DESCRIPTION OF THE DRAWINGS

An embodiment of the invention serving as an example is diagrammatically represented in the drawing, in which:

FIG. 1 shows a machining device in plan view;

FIG. 2 shows the device according to FIG. 1, in side view;

FIG. 3 shows the device according to FIGS. 1 and 2 in front view and

FIG. 4 shows the passage of individual workpieces for longitudinal or transverse machining.

DETAILED DESCRIPTION OF THE PREFERRED EMBODIMENTS

The device represented comprises a first conveyor unit 1 and a second conveyor unit 2, which are arranged mutually parallel and with a clearance between them and have opposite directions of travel A, B. Each conveyor unit 1, 2 comprises lower chain belts 3, to which upper chain belts 4 are assigned. The number and spacing of the lower chain belts 3 correspond to the workpiece dimensions to be machined. The lower chain belts 3 are not adjustable. The upper chain belts 4 are in each case designed as double chain belts, the spacing of which is determined by the smallest workpiece width. The lower and upper chain belts 3, 4 are synchronously driven via direct-current geared motors 5. For the joint drive of the lower chain belts 3, in each case a feed shaft 6 is provided.

The lower chain belts 3 are extended at their two ends beyond the corresponding upper chain belts 4 and form at this point an input region C or an output region D for the workpieces 7 shown in FIG. 4. In each of the four input and output regions C, D there is a roller track 8 which operates transversely to the direction of travel A or B, said tracks being able to be raised above the lower chain belts 3 as well as being able to be lowered between these lower chains. The roller track 8 in the output region D of the first conveyor unit 1 is linked to the opposite roller track in the input region C of the second conveyor unit 2 via a transverse conveyor 9, the direction of travel of which is marked by the arrow E.

Arranged between the two conveyor units 1, 2 is a machining cell or station 10 which comprises all the machining devices 11, such as saws, mortisers, edge-gluers and similar of the two conveyor units 1, 2. The machining cell 10 is surrounded by a soundproof case 12.

In the input region C of the second conveyor unit 2 there is a positioning backrest or stop 13 for the entering workpieces, which is adjustable in the direction of travel E of the transverse conveyor 9, arranged on a guide beam 14 above the workpiece transfer. The stop 13 can be positioned via a recirculating ball screw (not shown) and a direct-current geared motor according to the predetermined workpiece length. When machining workpieces with great differences in length, the use of several stops may be expedient.

The lower chain belts 3 are equipped with pushers, not shown, while the upper chain belts 4 are provided with a soundproof cover 15.

FIG. 4 illustrates the passage of the workpieces 7, 7a denoting a workpiece travelling in longitudinal direction and 7b denoting a workpiece travelling transversely. The machined workpiece edges are adjacent the machining device 11. It can be seen that the workpieces 7 are successively machined on one side and then on an opposite side, it being possible for the machining to be carried out independently of length and continuously. The central machining station 10 can be designed for one-man operation and have a central extractor. The provision of the soundproof case 12 at station 10 can keep the noise development below 85 dB. The device can be expanded into the combined machining center for separate longitudinal and transverse machining in one production line.

The workpieces to be machined are loaded in the input region C of the first conveyor unit 1 onto the raised roller track 8 in the direction of the arrow C. Lowering of the roller track 8 effects the transfer of the workpieces onto the lower chain belt 3, which with its pushers conveys the workpieces into the input region of the upper chain belts 4, which act on the workpieces from above exclusively in the region directly alongside the machining devices 11. The workpiece arriving in the output region D of the first conveyor unit 1 after the first machining is taken over by the roller track 8 provided there, by raising the latter, and deposited on the transverse conveyor 9, which brings the workpiece into the input region C of the second conveyor unit 2, where the workpiece is again taken over by the lower chain belts 3, after lowering of the corresponding roller track 8. The workpiece then passes in the direction of travel B through the second conveyor unit 2 and is machined on the edge which is opposite the edge first machined. For positioning of the workpieces in the second conveyor unit 2, the positioning backrest 13 is moved into the necessary position. The workpiece conveyed up to this point by the transverse conveyor 9 then runs up against this positioning backrest 13.

What is claimed is:

1. Device for machining plate-like workpieces, comprising:
   (a) first and second parallel conveyor units each including respectively, upper and lower chain belts arranged with a clearance therebetween and driven in opposite directions of travel;
   (b) the lower chain belts having opposite ends extending beyond corresponding opposite ends of the upper chain belts thereby forming input and output regions for the workpieces;
   (c) in the output region of the first conveyor unit and in the input region of the second conveyor unit are roller tracks which operate transversely to the opposite directions of travel of the first and second conveyor units, said tracks being able to be raised and lowered relative to the chain belts and being linked together by a transverse conveyor; and
   (d) a machining station between the first and second conveyor units which includes a plurality of machining devices adjacent the two conveyor units.

2. Device according to claim 1, wherein the lower chain belt has a workpiece carrying surface, said tracks being able to be raised above as well as being able to be lowered below the workpiece carrying surface.

3. Device according to claim 1, wherein the lower chain belt is equipped with pushers.

4. Device according to claim 1, wherein the upper chain belt is a double chain belt.

5. Device according to claim 1, wherein the lower and upper chain belts of each conveyor unit are driven synchronously via direct-durrent geared motors.

6. Device according to claim 1, wherein at least one stop for the workpieces, which is adjustable in the direction of travel of the transverse conveyor is arranged in the input region of the second conveyor unit.

7. Device according to claim 6, wherein the stop is positioned above the workpiece on a guide beam.

8. Device according to claim 1, wherein the machining station is surrounded by a soundproof case.

9. Device according to claim 1, wherein the upper chain belts are provided with a soundproof cover.

* * * * *